United States Patent [19]

Singer

[11] Patent Number: 4,517,042

[45] Date of Patent: May 14, 1985

[54] METHOD AND APPARATUS FOR DECURLING LAMINATED STOCK

[75] Inventor: Karl Singer, Palatine, Ill.

[73] Assignee: D&K Custom Machine Design, Inc., Elk Grove Village, Ill.

[21] Appl. No.: 609,776

[22] Filed: May 14, 1984

Related U.S. Application Data

[63] Continuation-in-part of Ser. No. 429,616, Sep. 30, 1982, Pat. No. 4,470,589.

[51] Int. Cl.³ ............................................. B65H 3/02
[52] U.S. Cl. .................................... 156/164; 156/322; 156/324; 156/555
[58] Field of Search ...................... 156/160, 163–164, 156/322, 324, 555, 494, 552, 582

[56] References Cited

U.S. PATENT DOCUMENTS

| | | | |
|---|---|---|---|
| 3,901,758 | 8/1975 | Humphries | 156/555 X |
| 4,069,081 | 1/1981 | Drower et al. | 156/324 X |
| 4,470,589 | 9/1984 | Singer | 156/552 X |

*Primary Examiner*—David Simmons
*Attorney, Agent, or Firm*—Robert E. Wagner; Ralph R. Rath

[57] ABSTRACT

A laminating machine includes a heated laminating roller (22) and a back-up roller (26) that are driven at different speeds to produce a controlled reduction in the peripheral surface speed of the back-up roller in relation to the peripheral surface speed of the laminating roller through a brake (90) to control curling in the laminated product. The laminating machine also includes pull rollers (100 and 102) that are driven by the back-up roller and are angularly adjustable to control the path of movement of the product along with dewrinkling mechanisms (44) for removing wrinkles from the film as it enters the laminating stations.

16 Claims, 2 Drawing Figures

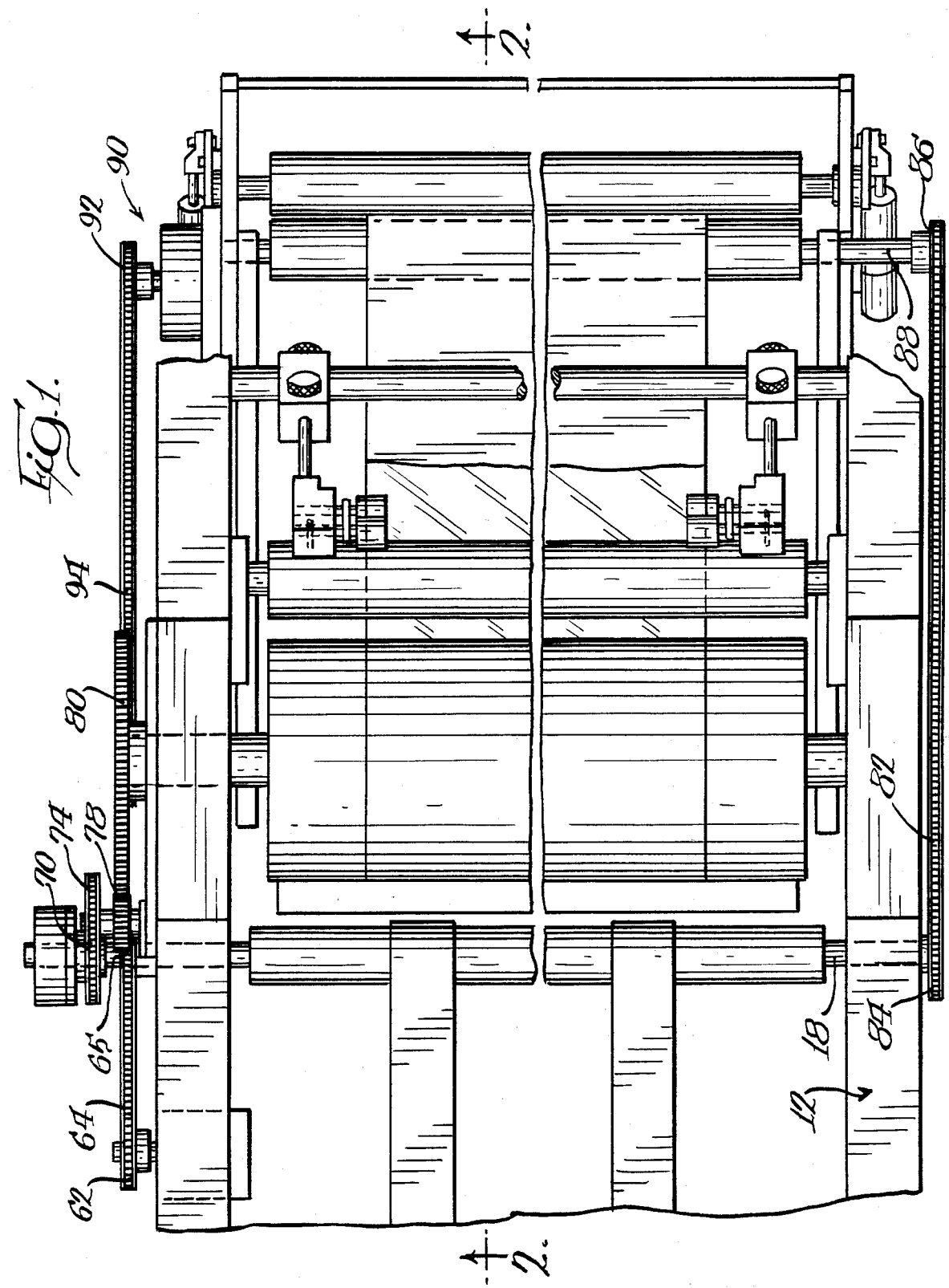

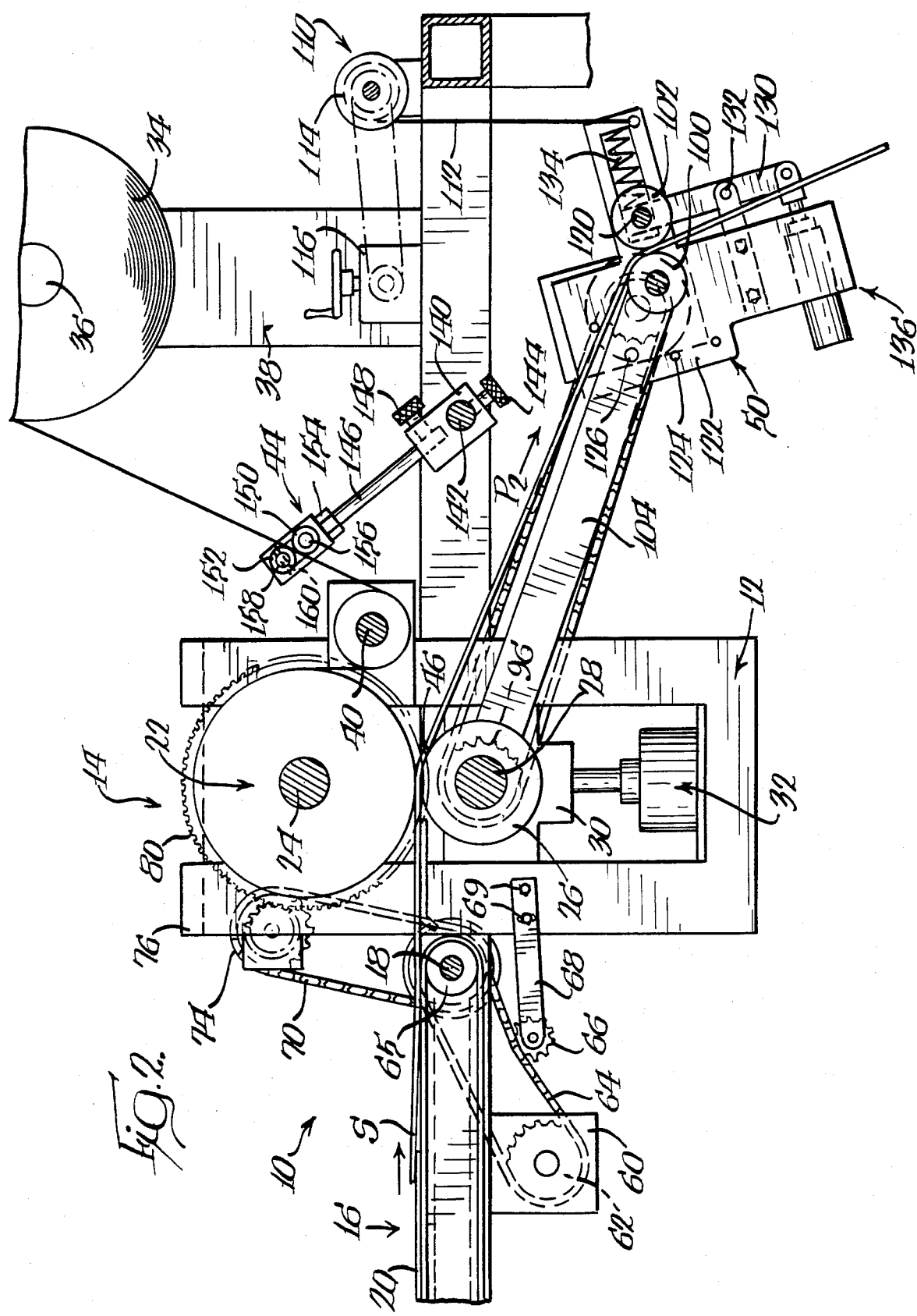

METHOD AND APPARATUS FOR DECURLING LAMINATED STOCK

REFERENCE TO RELATED APPLICATION

This application is a Continuation-In-Part application of co-pending application, Ser. No. 429,616, filed Sept. 30, 1982, now U.S. Pat. No. 4,470,589.

TECHNICAL FIELD

The present invention relates generally to laminating machines and, more particularly, to an improved method of laminating flexible film to discrete articles and at the same time compensating for curling tendency of the laminated article.

BACKGROUND PRIOR ART

The use of laminating machines for covering paper or other discrete articles with a film barrier has been known for many years. It has become customary to laminate various types of sheet products, such as product specification sheets, menus and the like. The laminating process usually consists of feeding individual sheets through a pair of laminating rolls which receive at least one continuous supply of laminating film that is joined with the sheet at the laminating station.

One of the problems encountered in this process is accurate control of the feeding of the sheets so that they are properly joined with the laminating film and the laminating film is free of any wrinkles. Since the laminating process requires heat to join the film to the sheets, the sheets are somewhat distorted during the laminating process causing the sheets to curl in most instances.

The above-referenced application, incorporated herein by reference, discloses a laminating machine that embodies a novel feeding mechanism that readily separates individual discrete articles from a stack of articles and feeds the articles sequentially to a laminating station where a continuous supply of film is mated with the article and laminated between a heated roll and a back-up roll. A single continuous film is laminated to at least one side, and many times both sides, of the discrete articles and the discrete articles with the film adhered thereto are then redirected along an angular path, in relation to the path of entry for the discrete article, to a pair of pull rollers that are driven at a slightly greater speed than the drive roller in the laminating station to tension the laminated article at the point of contact with the drive roller and reduce the difference in compression in the fiber structure between the top and bottom surfaces of the article.

This process has been proven to reduce curling of the laminated article which inherently occurs when sufficient heat is applied in the laminating station to adhere the film to the article. The tendency for the laminated article to curl in the direction of the film side of the laminated structure is very pronounced when laminating a single film to an article, as distinguished from the simultaneously-laminating film to both sides of the article.

It has also been established that the tendency to curl in the direction of the film side of a single film laminated product becomes even more acute as the film thickness decreases and creates more of a problem when working with non-oriented plastic film.

While considerable effort has been direct toward various solutions to the curling problem, such efforts have not been totally successful in eliminating the problem. In fact, suppliers of laminating equipment are presently advising customers that certain films cannot be utilized to produce an acceptable end product because of the curling problem.

SUMMARY OF THE INVENTION

According to the present invention, a new method of laminating has been developed that can virtually eliminate curling problems and still be able to use inexpensive, commercial non-oriented thin plastic film that is readily available at a reduced cost when compared to film presently being used in the same laminating process.

The method aspect of the present invention contemplates a change in the driving arrangement by positively driving the heated laminating roller with a power source and driving the back-up roller with the laminating roller and producing a controlled speed reduction on the back-up roller so that its peripheral surface speed is less than that of the heated laminating roller. This unique drive arrangement is believed to place the discrete article in longitudinal compression in relation to the film as it is being laminated thereto, resulting in a decurling effect for the laminated article.

In its preferred embodiment of the best mode for practicing the present invention, the heated roller is driven directly from a power source and the back-up or gripping roller is driven by the frictional forces resulting from engagement forces with the laminating roller. A brake is associated with the back-up roller to produce a controlled slow down of the back-up roller in relation to the laminating roller.

In the best mode set forth hereinafter, the apparatus also incorporates a pair of pull rollers downstream of the laminating station that change the path of movement of the laminated article to partially wrap the article around the back-up roller in the laminating station. The pull rollers are driven directly from the back-up roller to reduce the power requirements for the unit. The pair of pull rollers are further angularly adjustable to produce a further change in the path of the laminated article as it exits from the laminating machine downstream of the pull rollers.

BRIEF DESCRIPTION OF SEVERAL VIEWS OF DRAWINGS

FIG. 1 is a fragmentary plan view of the laminating machine constructed in accordance with the teachings of the present invention with the article-feeding mechanism associated with the machine being deleted for purposes of clarity; and, FIG. 2 is a cross-sectional view as generally viewed along line 2—2 of FIG. 1.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIGS. 1 and 2 of the drawings disclose a laminating machine, generally designated by reference numeral 10, consisting of a frame structure 12 that supports a laminating station, generally designated by reference numeral 14. Discrete articles, such as sheets S, are sequentially delivered from a stack of sheets (not shown) by a feeding machine to a feeding conveyor, generally designated by reference numeral 16. The feeding conveyor consists of a drive roller 18 supported on frame 12 and having a plurality of belts 20 entrained thereon which support an article and deliver the article to the laminating station 14. The feeding machine may be a separate unit constructed as described in the above co-pending application.

The laminating station 14 consists of a main laminating roller 22 supported on a shaft 24 which is rotatably supported at opposite ends on frame 12. A back-up or pressure roller 26 is also supported on a shaft 28, the opposite ends of which are rotatably supported on pillar blocks 30. The pillar blocks 30 are guided for vertical movement on frame 12 and are adapted to be raised and lowered with respect to frame 12 through fluid rams 32 to adjust the "nip" pressure between the laminating roller and the back-up roller.

A continuous supply of laminating film F is supplied from a supply roll 34 rotatably supported on a shaft 36 that extends between a pair of upstanding support brackets 38 extending above the main frame 12 for delivering a continuous supply of film F to the laminating station 14. The continuous supply of film is entrained over an idler roll 40 supported on a shaft 42 and then is entrained around laminating roller 22. A dewrinkling means or mechanism 44 is located between the supply roll 34 and the idler roll 40, the details of construction which will be described hereinafter.

As illustrated in FIG. 2, the idler roll 40 is placed in close proximity to the lower portion of the laminating roller 22 so that the film F is in contacting engagement around the majority of the laminating roller 22. The laminating roller 22 is heated through a suitable heating means (not shown) so that the film becomes heated while in contact with the laminating roller and thus adheres to the sheet S at the point of contact 46 with the back-up or pressure roller 26. In this respect, the fluid rams 32 are utilized to provide a predetermined pressure at the point of contact or nip 46 between the pressure roller 26 and the laminating roller 22.

The sheet or discrete article S, with the film F adhered thereto, exits from the laminating station 14 towards a pull mechanism, generally designated by reference numeral 50, and exits from the machine. The details of the pull mechanism 50 will also be described in detail hereinafter.

The laminating machine so far described is generally in all respects, similar to the machine disclosed in co-pending application Ser. No. 429,616, incoporated herein by reference. While this laminating unit has received a remarkable degree of commercial acceptance in the industry for laminating a single film to discrete articles, such as paper sheets, actual field use has shown that less than satisfactory results are obtained under certain conditions. It has been determined that as the film thickness decreases, particularly when utilizing nonoriented film, curling problems become acute.

According to the present invention, the curling problem encountered in the laminating process according to the co-pending application has been virtually eliminated by rearrangement of the drive mechanism for driving the rollers in the laminating station. As illustrated in FIG. 2, the drive mechanism consists of a drive motor 60 supported on frame 12 and having a drive sprocket 62 secured to an output drive shaft. A chain or belt 64 is entrained over drive sprocket 62 and also over a driven sprocket 65 fixed to the conveyor roller shaft 18. An idler sprocket 66 is supported on a bracket or arm 68 extending from frame 12 and is adjustable with respect to the frame through bolts 69 to adjust the tension of the belt or drive member 64.

The laminating roller 22 is driven directly from drive motor 60 through a drive chain or belt 70 that is entrained over a drive sprocket 72 on conveyor shaft 18 and a driven sprocket 74 rotatably carried by a stub shaft 75 on bracket 76. The drive sprocket 72 may be secured directly to conveyor shaft 18 or may be rotatably supported thereon and driven thereby through a clutch or other releasable connection 77. The driven sprocket 74 rotates stub shaft 75 and a gear or sprocket 78 is affixed thereto that is in mesh with an enlarged sprocket 80 secured to shaft 24 of laminating roller 22 so that the laminating roll 22 is driven directly from drive motor 60 through conveyor shaft 18.

The pressure roller or back-up roller 26 is driven directly from laminating roller 22 through the frictional forces developed between adjacent contacting surfaces. A brake 90 cooperates with back-up roller 26 to provide a controlled braking force, as described later. In the illustrated embodiment, the brake 90 is aligned with shaft 88 that forms part of the pull mechanism 50. A sprocket 92 is connected to brake shaft 93 and has a drive chain 94 entrained thereon, the opposite end of which is entrained over a further sprocket 96 secured to the pressure or gripping roller shaft 28. The brake is also connected directly to the shaft 88 to drive the pull mechanism 50, as will be explained later.

With the drive mechanism so far described, the drive motor 60 drives conveyor shaft 18, which in turn drives the heated laminating roller 22 through gears 78, 80, which will draw the film F from source or supply 34 around idler roll 40 onto the surface of laminating roller 22 where it is heated and adhered directly to article or sheet S. By proper selection of the respective sprockets and gears between motor 60 and gear 80, the peripheral surface speed of laminating roller 22 can easily be mated to correspond to the linear speed of sheets S moving along a linear path $P_1$.

At the same time, back-up or presssure roller 26 is also driven by the friction forces with laminating roller 22 and the brake 90 is utilized to maintain a controlled driving speed for gripping roller 26 so that the speed of its peripheral surface is slightly slower than that of the laminating roller 22.

It has been found that driving the laminating roller directly from a power source and the back-up roller indirectly through the laminating roller while controlling its speed with a brake can readily control the curling of the laminated article. In fact, tests have shown that, by proper selection of the relative speeds of the back-up roller and the laminating roller, the film F can actually be "bunched" at the entrance to nip 46. The laminated material can actually be curled in the direction opposite the film side using the controlled speed of the back-up roll in relation to the positively-driven laminating roller 22.

While one aspect of the invention has not been fully explored, it is believed that the presure at nip 46 developed by fluid rams 32 has some bearing on the curling effect of the laminated article.

The advantage of the present invention is that the concept and method can easily be incorporated into existing laminating machinery without extensive modification to obtain the benefits therefrom.

According to a further aspect of the present invention, the curling problem can be further controlled using the pull mechanism 50. As shown in FIG. 2, pull mechanism 50 consists of a pair of cooperating rolls 100 and 102. Roll 100 is secured to shaft 88 which is rotatably supported on a sub-frame 104 pivoted at one end on back-up roller shaft 28. Sub-frame 104 and pull mechanism 50 are adjustably supported and suspended on frame 12 through control mechanism 110. Control mechanism 110 includes a cable 112 wound on a drum 114 rotatable on frame 12 and driven by a hand-operated gear box 116.

Thus, the angular orientation of sub-frame 104 can be adjusted with respect to the path $P_1$ of the incoming article into the laminating station and exit along a path $P_2$ so that the article is partially wrapped around the back-up roller 26.

The curling can be further controlled through the pull mechanism 50 by a further adjustment for the path of movement of the laminated product. The second roll 102 is fixed to a shaft 120 rotatable on brackets 122 that are pivoted on shaft 88. Brackets 122 having a plurality of adjustment holes 124 all equally offset from the axis of shaft 88 and aligned with an opening (not shown) in sub-frame 104. A bolt 126 is received through one of the adjustment holes 124 and opening in sub-frame 104 to have the laminated article exit from pull mechanism 50 along a path $P_3$ angularly related with respect to path $P_2$. Since the film is still cooling as it passes through pull mechanism 50, the laminated article "sets" in a generally planar condition after it exits from the pull mechanism.

The pull mechanism also has a biasing means and a retract mechanism for the second roll 102 on brackets 122. Shaft 120 is rotatably supported on arms 130 pivoted intermediate opposite ends on a pin 132 and biased toward roll 100 by springs 134. Roll 102 is retracted against the action of springs 134 through fluid retract rams 136 interposed bewteen bracket 122 and arm 130.

As explained above, the shaft 88 is connected directly to brake 90 to be driven through the brake from the back-up roller 26, eliminating the need for a separate drive chain from motor 60 to the pull mechanism 50. A further advantage derived from the arrangement is that the machine operation can quickly be interrupted without shutting down drive motor 60. The movement of the film and the article through the laminating station can be interrupted quickly by retracting the fluid rams 32, which separates the back-up roller 26 from the laminating roller 22. Since frictional forces are necessary between rollers 22 and 26 to draw the film F from supply roll 34, retraction of the back-up roller will interrupt the movement of the film immediately and interrupts the drive for the pull mechanism 50 since it is being driven from the back-up roller 26.

The laminating machine of the present invention also incorporates a novel dewrinkling mechanism 44 for the supply of film F. Mechanism 44 includes a pair of blocks 140 supported on a cross-bar 142, forming part of frame 12, and adjustably retained thereon by thumb screws 144. Each block 140 has an opening for receiving a rod 146 having dewrinkling mechanism 44 on a free end thereof and adjustably retained in block 140 through a thumb screw 148.

Dewrinkling mechanism includes a pair of rollers 150 and 152 freely rotatable on a clevis 154 at the outer end of rod 146. Roller 150 is freely rotatable on a shaft 156 carried by clevis 154, while roller 152 is rotatable on a shaft 158 pivoted about a pin 160 on clevis 154. Shaft 158 and roller 152 are biased toward roller 150 through biasing means (not shown), such as rubber bands.

Thus, the film F is gripped along opposite edges of the two pairs of cooperating rollers 150 and 152 and is actually stretched while in a suspended state before it passes over idler roller 40. Of course, the angular position of shafts 156 and 158 can easily be changed by releasing thumb screws 148 and rotating rods 146 on block 140.

As can be appreciated, the present invention provides a simple arrangement for driving the laminating roller and back-up roller in a unique controlled manner to produce a laminated product that will exit in a flat state and can use non-oriented plastic film that is readily available at minimum prices. Of course, the drive could be with a separate DC variable speed drive motor for the laminating roller and the back-up roller, respectively, rather than the single variable speed drive motor illustrated. Also, the brake 90 could be attached directly to the end of back-up roller shaft 28 and the pull mechanism could be driven directly from drive motor 60.

I claim:

1. A method of laminating a flexible film to a discrete article comprising feeding the discrete article along a path to a laminating station between a heated laminating roller and gripping roller, providing a laminating film from a supply into contacting engagement with said laminating roller and between said laminating roller and said gripping roller in said laminating station, driving said laminating roller to draw said film from said supply through said laminating station, and maintaining a controlled driving speed on said gripping roller so that the peripheral speed of the gripping roll is less than the peripheral speed of said laminating roll to decurl said flexible film while the film is being laminated to said discrete article in said laminating station.

2. A method as defined in claim 1, in which the discrete article with the laminated flexible film exits from the laminating station along a generally flat plane angularly related to the entrance plane of said discrete article and is gripped along said plane by a pair of cooperating rollers, including the further step of positioning the cooperating rollers to change the angular orientation of the discrete article with the laminated film thereon to further decurl said flexible film.

3. A method as defined in claim 2, in which a first of said cooperating rollers has a fixed axis with respect to said flat plane and a second of said cooperating rollers is pivotable about said fixed axis to vary said angular orientation.

4. The method as defined in claim 1, including the further step of gripping opposite edges of the film as it enters the laminating station to spread the film and remove any wrinkles.

5. The method as defined in claim 4, in which each edge of said film is gripped between a pair of rolls having axes of rotation angularly related to the path of said film while the film is suspended between said pairs of rolls.

6. The method as defined in claim 3, in which said gripping roller is driven through said laminating roller and one of said cooperating rollers is driven by said gripping roller.

7. The method as defined in claim 3, including the further step of resiliently urging the second cooperating roller toward the first cooperating roller.

8. The method as defined in claim 1, in which said gripping roller is frictionally driven by said laminating roller and said controlled driving speed is maintained by a brake cooperating with said gripping roller.

9. A method of laminating a single layer of flexible film to a discrete article comprising feeding discrete articles along a path to a laminating station having a heated laminating roller and a back-up roller in frictional engagement with each other, feeding the flexible film from a supply around a major portion of said laminating roller, driving said laminating roller to draw said film from said supply and said discrete article from said path between said laminating roller and said back-up roller through said laminating station, and producing a controlled braking force on said back-up roller and reduce its peripheral surface speed relative to the peripheral surface speed of the laminating roller to produce a controlled movement of the discrete article and film through the laminating station thereby controlling curling of the finished laminated article.

10. A method as defined in claim 9, and further including a pair of cooperating pull rollers downstream of said laminating and back-up rollers and in which the pull rollers are driven by said back-up roller.

11. A method as defined in claim 10, in which the back-up roller is movable relative to the laminating roller for varying said frictional engagement and separating said back-up roller from said laminating roller to simultaneously interrupt the drive to said back-up roller and said pull rollers.

12. Apparatus for laminating a flexible film to a sheet comprising means for feeding a sheet along a path to a laminating station having a heated laminating roller and a back-up roller with drive means for driving said rollers and with a film supply spaced from said laminating station for supplying film to said laminating roller, the improvement of connection means for driving said laminating roller from said drive means to produce a predetermined speed on a peripheral surface of said laminating roller and means for driving said back-up roller through said laminating roller at a reduced speed with respect to said peripheral surface to produce a decurling action on said flexible film during the lamination process.

13. Apparatus as defined in claim 12, in which said means for driving includes brake means cooperating with said back-up roller to maintain said reduced speed.

14. Apparatus as defined in claim 13, further including a pair of cooperating rollers spaced from said laminating roller and back-up roller for gripping said article with film adhered thereto, and in which said means for driving includes further means for driving said cooperating rollers from said back-up roller.

15. Apparatus as defined in claim 14, in which said means for driving includes means for shifting said back-up roller with respect to said laminating roller to (1) vary friction forces therebetween; and, (2) separate said back-up roller from said laminating roller to simultaneously interrupt the drive to said back-up roller and said cooperating rollers.

16. Apparatus as defined in claim 14, further including gripping means between said film supply and said laminating roller for gripping opposite edges of said film in a suspended state to stretch said film between opposite edges thereof.

* * * * *